United States Patent [19]

Geczy et al.

[11] Patent Number: 4,719,076
[45] Date of Patent: Jan. 12, 1988

[54] TUNGSTEN CARBIDE CHIPS-MATRIX BEARING

[75] Inventors: Bela Geczy; Robert G. Toth, both of Orange, Calif.

[73] Assignee: Smith International, Inc., Newport Beach, Calif.

[21] Appl. No.: 795,218

[22] Filed: Nov. 5, 1985

[51] Int. Cl.$^4$ .................. B22F 7/08; B21D 53/10
[52] U.S. Cl. ........................................ 419/8; 419/18; 75/240; 29/149.5 NM; 29/149.5 PM
[58] Field of Search .............. 29/149.55, 149.5 PM, 29/530, DIG. 25, DIG. 31, DIG. 29; 419/8, 18, 47; 501/87, 93; 75/240; 423/440; 308/DIG. 5; 384/902; 109/80, 82

[56] References Cited

U.S. PATENT DOCUMENTS

| | | | |
|---|---|---|---|
| 2,331,584 | 10/1943 | Underwood | 29/149.5 PM |
| 2,581,252 | 1/1952 | Goetzel et al. | 29/156.8 B |
| 3,127,224 | 3/1964 | Owens et al. | 29/149.4 PM |
| 4,017,480 | 4/1977 | Baum | 75/240 |
| 4,146,080 | 3/1979 | Baum | 75/240 |

FOREIGN PATENT DOCUMENTS

| | | | |
|---|---|---|---|
| 770060 | 3/1957 | United Kingdom | 384/902 |
| 805638 | 12/1958 | United Kingdom | 384/902 |

*Primary Examiner*—Lowell A. Larson
*Attorney, Agent, or Firm*—Price, Gess & Ubell

[57] ABSTRACT

A blend of tungsten carbide powder and cemented tungsten carbide cobalt chips is loaded into a cavity surrounding a steel bearing blank and infiltrated with a copper base infiltrant to create a chip matrix bearing surface.

7 Claims, 3 Drawing Figures

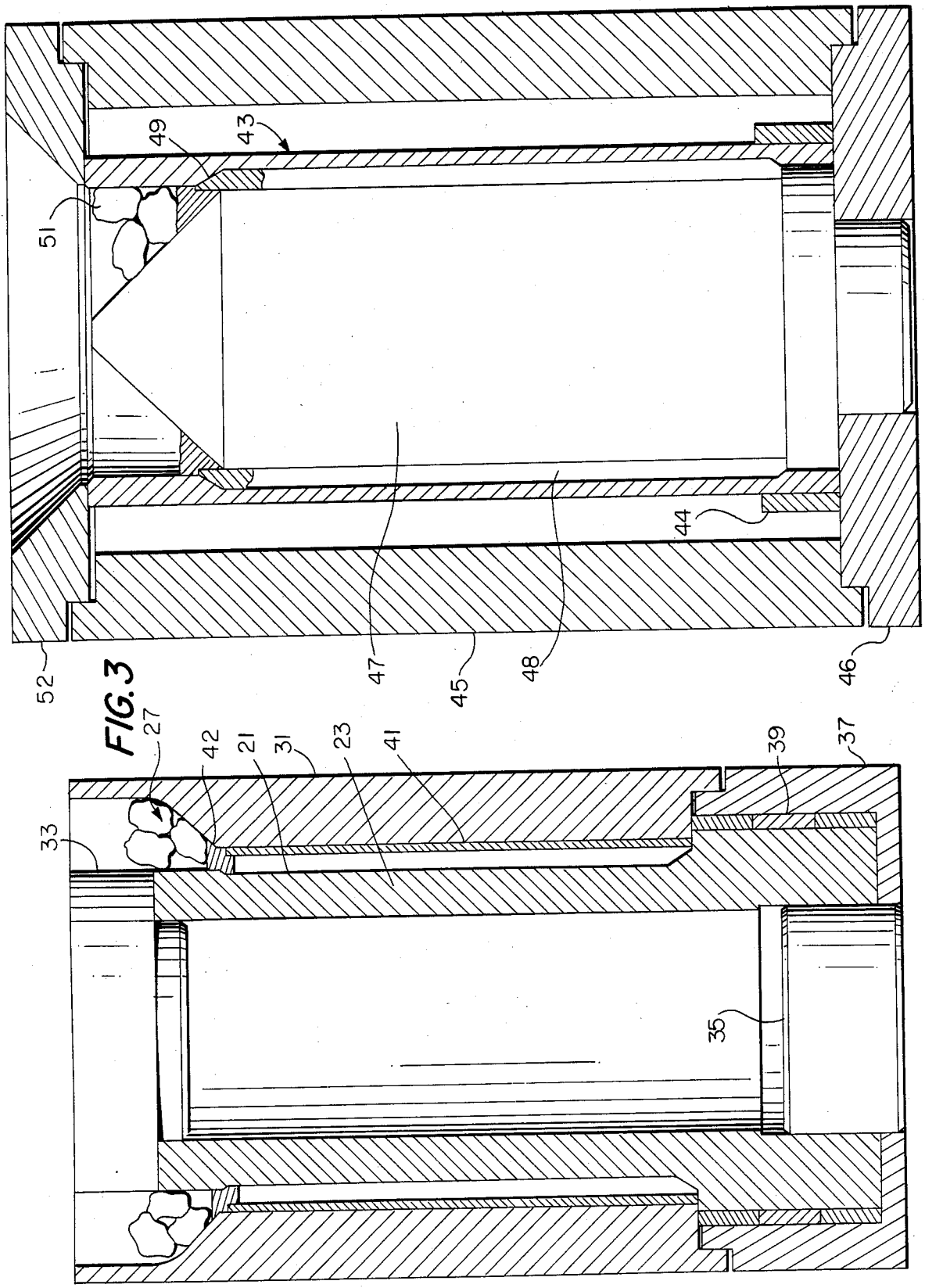

TUNGSTEN CARBIDE CHIPS-MATRIX BEARING

BACKGROUND OF THE DISCLOSURE

The subject invention pertains to metal bearings, and more particularly to bearings employing tungsten carbide surfaces.

In the prior art, bearing surfaces employing tungsten carbide have been manufactured by molding tungsten carbide buttons to a steel radial bearing sleeve utilizing a fine tungsten carbide powder and copper base infiltrant. The buttons are affixed to the surface of the carbon mold in a predetermined pattern which, depending upon size, may utilize as many as 299 buttons. Once molded into place, the buttons and surrounding matrix must be machined finished.

The process of setting the buttons is relatively labor intensive. In addition, the tungsten carbide buttons are more expensive than tungsten carbide chip material. Therefore, it has appeared to the inventors that an improved and less expensive bearing surface might be constructed from available tungsten carbide chip material.

SUMMARY OF NOVEL ASPECTS OF THE DISCLOSURE

It is therefore an object of the invention to provide an improved bearing structure.

It is another object of the invention to provide a less expensive process of manufacturing a bearing surface employing tungsten carbide material.

It is another object of the invention to eliminate the expense involved in setting tungsten carbide buttons in prior art bearing structures.

It is still another object of the invention to provide a tungsten carbide bearing structure and process which is less expensive than those of the prior art.

In accordance with the invention, a chip matrix is created from a mixture of macro-crystalline tungsten carbide powder and cemented tungsten carbide cobalt chips. The blend is such that the mixture of powders may be loaded in a cavity surrounding a steel blank. Copper infiltrant nuggets are then suspended above a vibrated mixture of the powders and heated to achieve infiltration of the mixture. The assembly is thereafter cooled to provide a bearing surface ready for finishing. The resultant chip matrix may be molded closer to final size, therefore requiring less time to finish compared to the prior art button structure. An additional advantage is that the percentage of tungsten carbide bearing surface area is increased over the molded button approach.

BRIEF DESCRIPTION OF THE DRAWINGS

FIG. 2 illustrates a graphite molded steel blank utilized according to the preferred embodiment.

FIG. 3 illustrates a graphite mold and steel blank also used according to the preferred embodiment.

DETAILED DESCRIPTION OF THE PREFERRED EMBODIMENT

Figure 1:
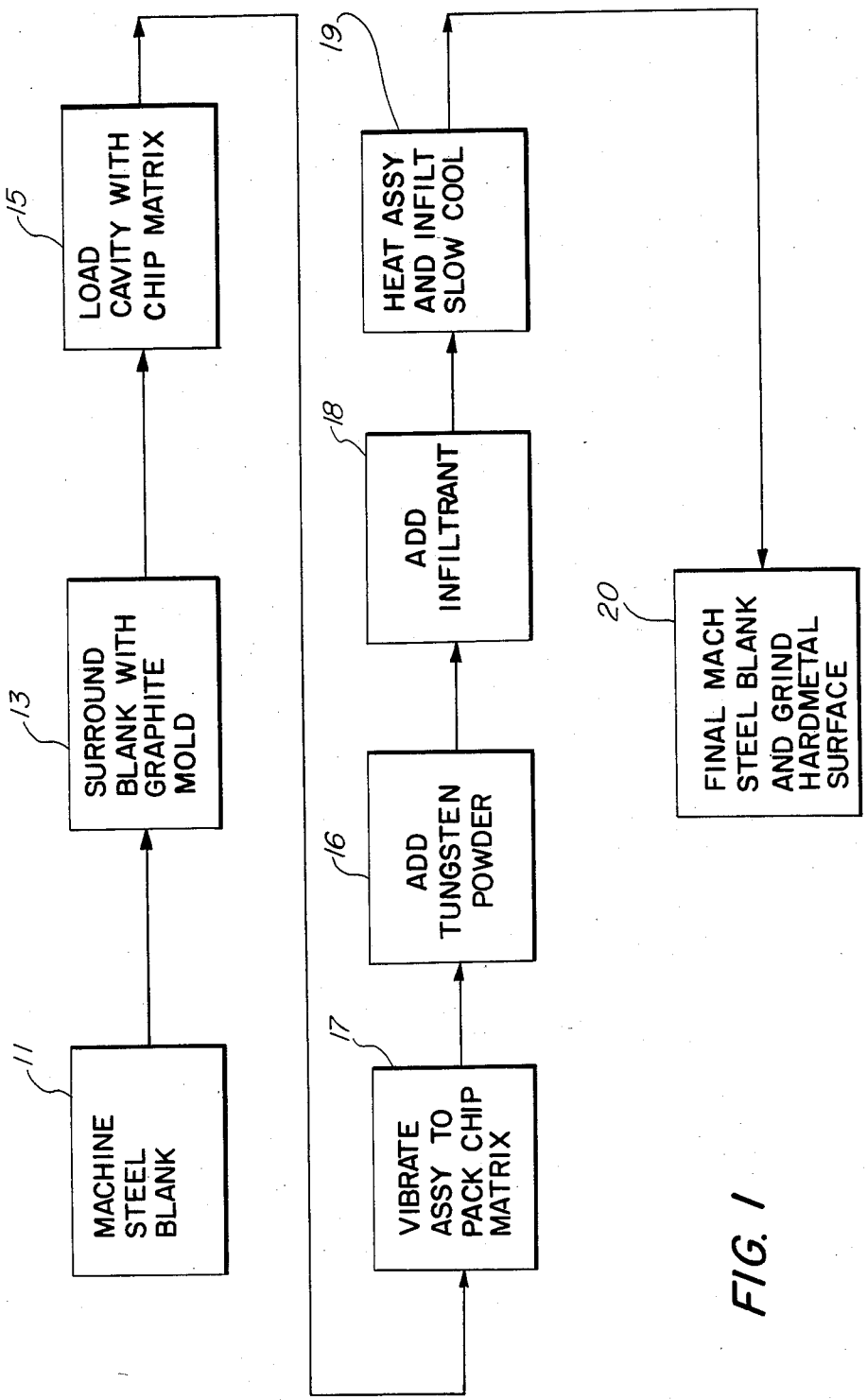
FIG. 1 is a flow chart illustrating the process of manufacturing a bearing surface according to the preferred embodiment.

According to the process illustrated in FIG. 1, macro-crystalline tungsten carbide powder is blended together with cemented tungsten carbide cobalt chips. This mixture is preferably comprised of sixty percent (60%) by weight of 80 mesh and down macro-crystalline tungsten carbide, commercially available as the Kenametal product designated P-90. The range of particle sizes, i.e. 80 mesh and down, is selected for optimum packing density of the mixture.

The other component of the mixture is forty percent (40%) by weight of cemented tungsten carbide cobalt chips, for example TCM 10/18 mesh crushed WC-Co C grade. A suggested range for the percentage of weight of tungsten carbide cobalt chips is from forty to eighty percent (40-80%), with the preferred percentage being forty percent (40%).

To create a bearing surface, a steel blank is first machined (step 11) and then surrounded by a graphite mold (step 13). The blended mixture is loaded into a cavity 21 (e.g. FIG. 2) created between the steel blank and graphite mold, step 15. The mold contents are then vibrated, step 17, for maximum density of the blended mixture tungsten powder 42 is shown added to the mold in step 16. Copper infiltrant nuggets are then inserted in the mold at step 18.

The mold contents are then heated to 2050 degrees Fahrenheit (F), plus or minus 25 degrees F., for example by induction heating, step 19. The heated powder mixture in the cavity 21 is infiltrated through capillary action with copper base infiltrant, step 19 and slow cooled to room temperature. After cooling, the parts are machined to specific dimensions by grinding, step 20.

FIG. 2 illustrates a particular set-up for use in the subject process for applying a bearing surface to the outer surface of a cylindrical steel bearing blank 23. The apparatus includes a mold body 31, a mold cap 33 and a mold plug 35. The mold body 31 rests in a mold base 37 and is separated from the bearing blank 23 by graphite fiber 39. Graphite fiber 41 also lines the inner wall of the mold body 31. The infiltrant 27 is separated by a layer of tungsten powder 42 from the cavity 21 which contains the blended mixture of tungsten carbide powder and cemented tungsten carbide cobalt chips. The tungsten powder when infiltrated facilitates machining of the end of the sleeve.

FIG. 3 illustrates mold apparatus similar to FIG. 2 for applying a bearing surface to the inner surface of a cylindrical steel bearing blank 43. The mold apparatus includes a mold body 45 and a mold base 46 which surrounds the blank 43. A graphite belt ring 44 is attached by double-sided adhesive tape to the lower end of the blank 43. A funnel 52 rests upon the top of the mold body 45. A core 47 is positioned within the bearing blank 43 to create a cavity 48 for the blended mixture of tungsten carbide power and cemented tungsten carbide chips. Again, a layer of tungsten powder 49 is used to separate the infiltrant nuggets 51 from the cavity 48.

As will be apparent to those skilled in the art, the subject invention admits of numerous adaptations and modifications without departing from the scope and spirit of the invention. Therefore, it is to be understood that, within the scope of the appended claims, the invention may be practiced other than as specifically described herein.

What is claimed is:

1. A process of bearing manufacture comprising the steps of:
   blending together a mixture of macro-crystalline tungsten carbide powder and cemented tungsten carbide cobalt chips;

sandwiching a layer of said mixture between an upright blank metal surface and an upright mold surface;

vibrating the mixture to obtain maximum density thereof;

adding a tungsten powder layer above the layer of said mixture;

loading a coper base infiltrant above the tungsten powder layer;

heating the mixture layer, infiltrant, and tungsten powder layer to achieve infiltration of the heated mixture with the copper base infiltrant; and; cooling the mixture.

2. The process of claim 1 wherein the blank is fabricated of steel.

3. The process of claim 1 wherein the mixture comprises about forty percent (40%) by weight of cemented tungsten carbide cobalt chips and sixty percent (60%) by weight of macro-crystalline tungsten carbide powder.

4. The process of claim 1 wherein the macro-crystalline tungsten carbide comprises a mixture of 80 mesh and down macro-crystalline tungsten carbide powder particles.

5. The process of claim 1 wherein the step of heating comprises heating to a temperature of about 2050 degrees fahrenheit.

6. A process of bearing manufacture comprising the steps of:

blending together a mixture of macro-crystalline tungsten carbide powder and cemented tungsten carbide cobalt chips;

sandwiching a layer of said mixture between an upright blank metal surface and an upright mold surface;

vibrating the metal surface, mold surface and sandwiched layer;

adding a tungsten powder layer above the layer of said mixture;

loading a copper base infiltrant above the tungsten powder layer;

heating the mixture layer, infiltrant, and tungsten powder layer to melt the infiltrant and cause it to pass through the tungsten powder layer to achieve gravity fed infiltration of the heated mixture layer with the copper base infiltrant; and cooling the mixture.

7. The process of claim 6 wherein said tungsten powder layer and copper base infiltrant are combined to form a layer which facilitates machining of said bearing.

* * * * *